United States Patent [19]
Goodman et al.

[11] 3,831,755
[45] Aug. 27, 1974

[54] FILTRATION APPARATUS
[75] Inventors: Brian L. Goodman, Overland Park, Kans.; Frank G. Weis, Kansas City, Mo.; Kenneth A. Mikkelson, Overland Park, Kans.
[73] Assignee: Ecodyne Corporation, Chicago, Ill.
[22] Filed: June 28, 1971
[21] Appl. No.: 157,406

[52] U.S. Cl................ 210/108, 210/274, 210/275, 210/333
[51] Int. Cl............................................ B01d 23/24
[58] Field of Search....... 210/80, 82, 108, 333, 341, 210/274, 275, 276–278

[56] References Cited
UNITED STATES PATENTS

| | | | |
|---|---|---|---|
| 1,232,805 | 7/1917 | Jerwell | 210/80 |
| 2,391,716 | 12/1945 | Koupal | 210/275 X |
| 3,111,487 | 11/1963 | Martin | 210/278 X |
| 3,134,735 | 5/1964 | Greenleaf, Jr. | 210/333 X |
| 3,329,272 | 7/1967 | Roach | 210/275 X |
| 3,428,177 | 2/1969 | Ruff | 210/274 X |

Primary Examiner—John Adee

[57] ABSTRACT

An improved apparatus for the cleaning of filter beds of a filtration apparatus which comprises a plurality of filter units, each of the units having an upper influent zone, a filter bed, and a lower filtrate zone, and including means for pumping liquid from all of the filtrate zones at a given pumping rate. In accordance with the invention, during the service cycle, liquid is pumped by the pump means from the filtrate zones to service, so that it passes through the filter bed in a downflow direction. When one of the filter units requires backwashing, the pump means is employed to pump liquid simultaneously from the filtrate zones of a majority of the filter units, so that the backwash rate is greater than the normal downflow rate through the filter unit. As an alternative to backwashing a minority of the filter unit with liquid from the majority of the units, or in addition thereto, the increased backwashing rate can be provided by increasing the pumping rate beyond the given rate during the backwashing by using booster pump means.

8 Claims, 4 Drawing Figures

FILTRATION APPARATUS

The present invention relates to an improved apparatus for the filtration of liquids.

Filter units of the type having an upper influent zone, a lower filtrate zone, and a filter bed between the influent and filtrate zones are well known in the art. Such filter units are designed to filter liquids flowing in a downflow direction through the filter bed. Periodically, the filter bed must be cleaned to remove entrapped particles, and such cleaning is accomplished by "backwashing" the filter, i.e., by delivering liquid through the filter bed in an upflow direction. In order to achieve good backwashing efficiency, it is preferred that the backwashing liquid be delivered at a relatively high rate of speed, preferably above the rate at which the liquid is delivered through the filter in a downflow direction during normal operation. It is also conventional to precede the backwashing step with an "air-scour" step, in which air under pressure is forced upwardly through the filter bed, releasing entrapped particles and making it easier to carry them away during the backwashing step. Such air scouring is preferably performed with a relatively small amount of liquid, say 6 inches, above the filter bed.

It has been conventional in the art to provide filters of the type described above with backwash storage chambers in which to store water for backwashing. A separate backwash pump or a backwash booster pump is often required to provide sufficient flow rates for efficient backwashing.

It is an object of the present invention to provide a filtration apparatus which eliminates any requirement for backwash storage tanks, and, in certain embodiments, also eliminates the requirement for multiple pumps, while still providing a rate of backwash liquid delivery that is greater than the normal downflow rate through the filter media.

Generally, the present invention provides an improved apparatus for cleaning the filter beds of a filtration apparatus having a plurality of filter units, wherein each of the units have an upper influent zone, a filter bed, and a lower filtrate zone, and where the apparatus includes pump means for removing liquid from all the filtrate zones at a given pumping rate. In one general embodiment of the invention, the filter bed is backwashed by pumping liquids with the pump means from the filtrate zones of a majority of the filter units to the filtrate zones of a minority of the filter units, whereby the minority of the filter units are backwashed with filtered liquid from the majority of the filter units at a rate greater than the normal downflow rate of the units.

In a second general embodiment, it is not necessary to have a minority of the filter units cleaned with liquid from a majority of the units, but in this instance it is necessary to increase the rate at which liquid is pumped to the filtrate zones of the portion of the filter unit that is being backwashed in order to backwash that portion of the filter units at a rate greater than the normal downflow rate of the units.

In one aspect of the apparatus of the present invention, the filtration apparatus comprises a plurality of filter units, each of which comprises an upper influent zone, a filter bed, and a lower filtrate zone. Means are provided for delivering liquid to each of the influent zones and means including pump means are operatively connected for pumping liquid from all of the filtrate zones to service at a given pumping rate. For backwashing the filter beds, means are provided for delivering liquid from the filtrate zones of a majority of the filter units through the pump means to the filtrate zones of a minority of the filter units, so that the filter beds of the minority of the units are backwashed with filtered liquid delivered simultaneously from the majority of the filter units.

As an alternative embodiment, means are provided for delivering liquid from the filtrate zones of a first portion of the filter units, which need not be a majority, through the pump means to the filtrate zones of a second portion of the filter units whereby to backwash the filter beds of the second portion of the filter units with filtered liquid from the first portion of the units. In this instance, booster pump means are provided operatively connected to pump additional liquid from the filtrate zones of the first portion of the filter units to the filtrate zones of the second portion, thus enabling the production of a backwash rate which is in excess of the normal downflow rate of the filters.

The invention, its construction and method of operation, together with further objects and advantages thereof, will be best understood by reference to the following detailed description, taken in conjunction with the drawings, in which.

Figure 1:
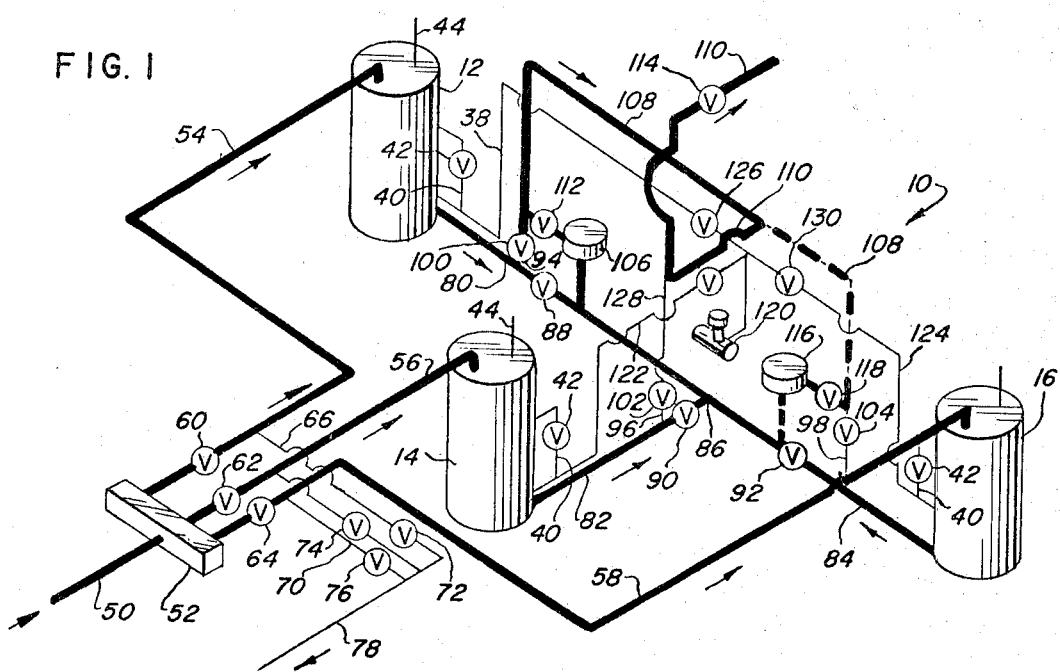
FIG. 1 is a perspective flow diagram showing a filtration apparatus constructed in accordance with the present invention, in which all of the filter units are in the service cycle.

Basically, the present invention takes advantage of the fact that, in a system employing a plurality of filter units, the filtrate from a portion of the units may be delivered directly to another portion of the units, thus eliminating any requirement for a storage tank for backwash liquid.

In one embodiment, the invention also takes advantage of the fact that it is desirable to pump water from the effluent zones of a number of filter units through a single pump, thus cutting the costs of pumping while making it relatively simple to achieve the same flow rate from each of the units. In this embodiment, three or more filter units are employed, and the filtrate from a majority of the filter units is used to backwash a minority of the filter units, thus providing an increased flow rate through the minority of the filter units during backwashing even though no auxiliary or booster pump means are employed. For example, in a system comprising three filter units, where a single pump is used to pump liquid from the effluent zones of these units during the normal service cycle, this pump will provide three times the normal downflow rate for backwashing when two of the units are connected through the pump to backwash the remaining unit.

If the rate at which liquid is pumped from the filtrate zones of the majority of the units to the filtrate zones of the minority of the units is increased during the backwashing step, even higher backwashing rates may be achieved. For example, in the above-mentioned system wherein three filter units are employed, if two identical pumps were used during the backwashing cycle, while only a single pump were used during the service cycle, the backwashing rate to the unit being backwashed would be six times the normal downflow rate. When such an auxiliary pump is employed, it has the additional advantage that it can be used to increase the filtration rate during the service cycle during times when the delivery of liquid for filtration becomes abnormally high. A second advantage to the use of such an auxiliary pump is that it may be substituted for the primary pump in situations where the primary pump means fails.

As will be appreciated from the foregoing, when auxiliary or booster pump means is employed in accordance with the present invention, it is no longer essential that a minority of the filter units be backwashed by filtrate from a majority of the units. That is, the booster pump means may be relied upon entirely to provide the required increased flow rate for efficient backwashing. However, it is nevertheless preferred to employ a majority of the filter units to backwash a minority of the units, since a larger volume of liquid is thereby available for backwashing, and excessive flow rates through the units supplied the backwashing liquid are less likely to be encountered.

Irrespective of whether or not the majority of the filter units is used to backwash a minority of the units, it is also desirable in accordance with the present invention to deliver air under pressure upwardly through the filter bed prior to the backwashing step in order to loosen entrapped particles and to increase the efficiency with which they are removed during the filtration step.

Figure 2:
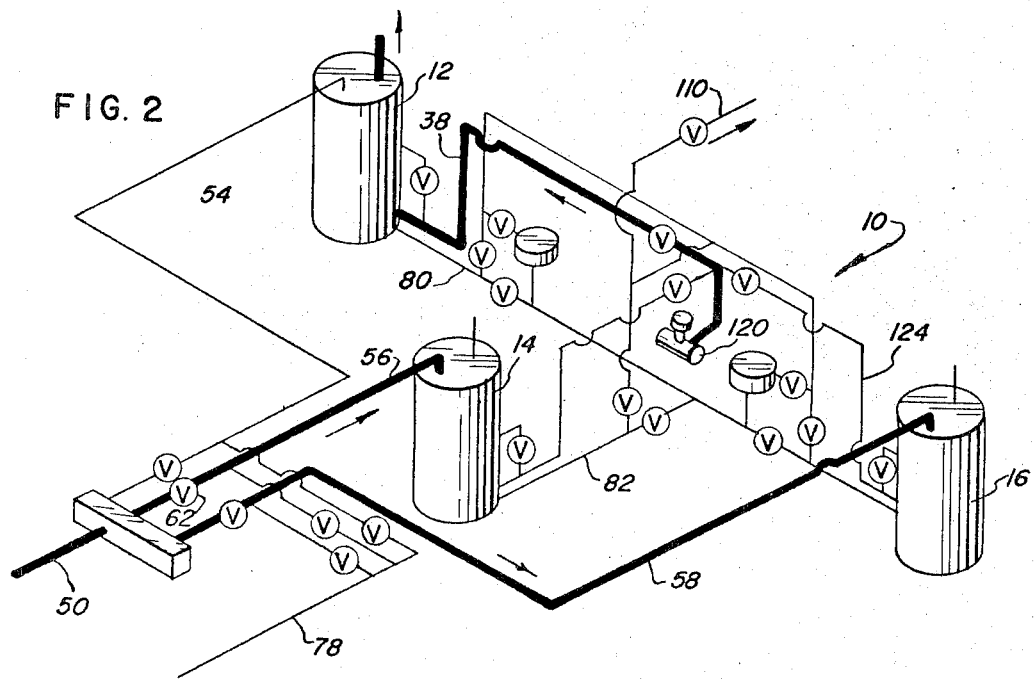
FIG. 2 is a perspective flow diagram similar to FIG. 1, showing the filtration apparatus during the air-scour cycle for one of the filter units.
Figure 3:
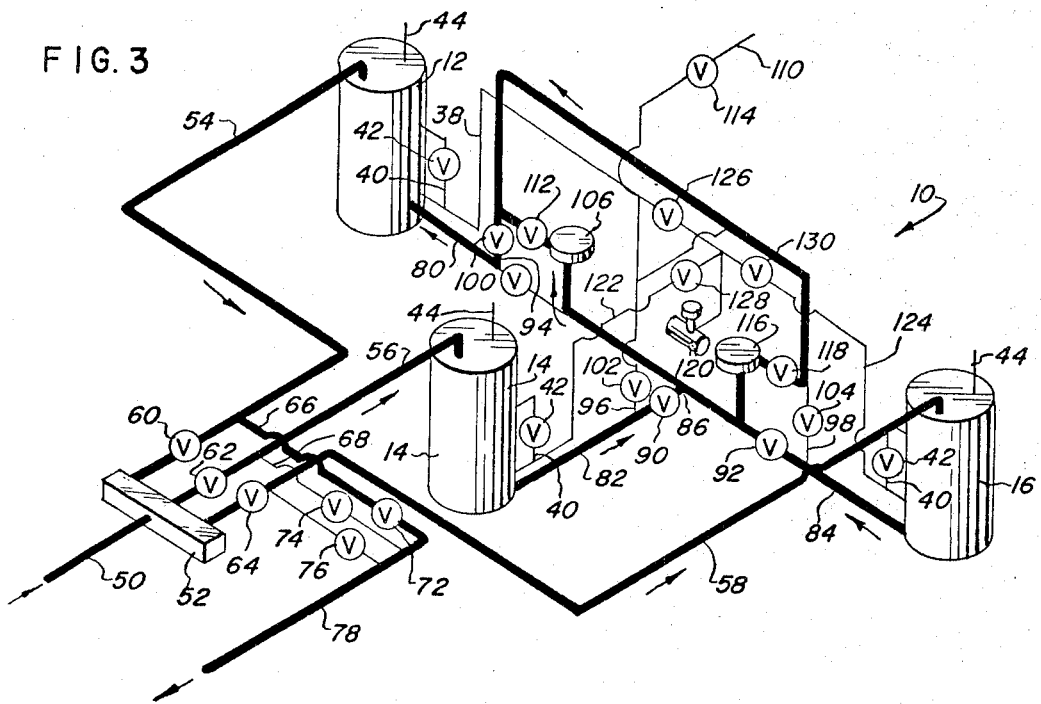
FIG. 3 is a perspective flow diagram similar to FIG. 1, showing the filtration apparatus during the backwashing cycle for one of the filter units.

Referring now to the drawings, FIGS. 1–3 show an apparatus constructed in accordance with the present invention, generally indicated by reference numeral 10. In each of the embodiments, flow of liquid or gas is indicated by the use of heavy lines, and direction of flow is indicated by arrows. Pipes through which no liquid or gas is flowing are indicated by lighter lines.

Referring to FIGS. 1–3, the embodiment illustrated comprises a first filter unit 12, a second filter unit 14, and a third filter unit 16. These three units are identical, and are illustrated in cross-section in FIG. 4. For convenience, FIG. 4 will refer only to the first filter unit 12, bearing in mind that the other two units 14, 16 are identical.

Basically, the filter unit 12 comprises a tank 18, having a false bottom member 20 secured to a lower portion of the interior thereof in water-tight fashion by welding or the like. The false bottom member 20 has openings 22 to permit liquid to flow therethrough. The filter bed 24 is carried by the false bottom member 20, and comprises a filtration medium that is suitable for the liquid being filtered and the size and type of particles to be removed. Examples of suitable filter media include sand, anthracite, combinations of sand and anthracite, stone, and the like, as well as more specialized filtration media such as ion exchange resins and the like. Suitable filters 26 are provided to prevent the filter media from passing through the openings 22. The area below the false bottom member 20 is referred to as the effluent or filtrate zone 28, while the area above the filter bed 24 is referred to as the influent zone 30.

In the particular embodiment shown, each filter unit has a lower level sensor 32, an upper level sensor 34, and a high level sensor 36. While the sensors shown are float-type sensors, other types of sensors such as pressure sensors and/or conductivity sensors may also be employed.

Figure 4:
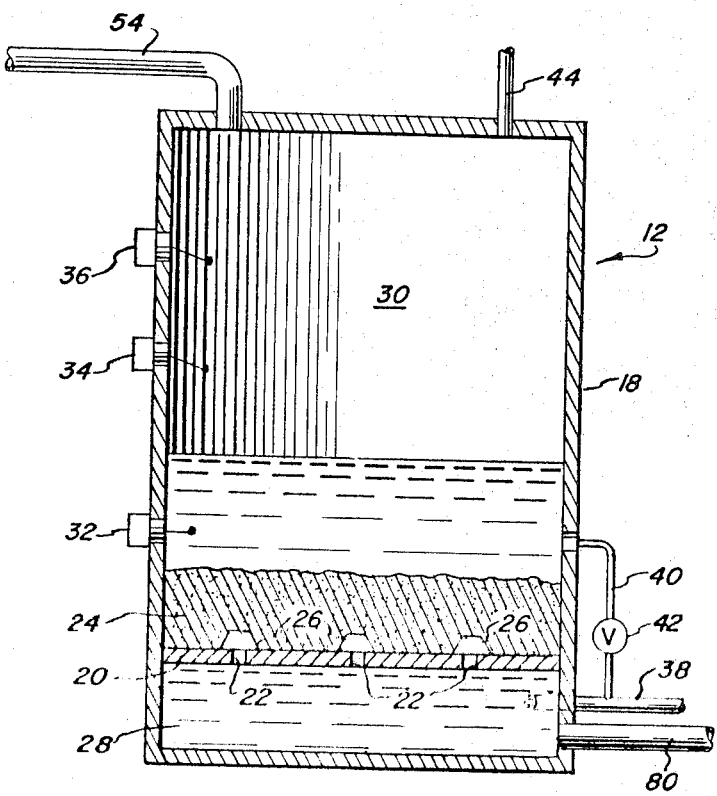
FIG. 4 is a simplified cross-sectional view of a filter unit suitable for use in an apparatus constructed in accordance with the present invention.

As shown in FIG. 4, and as hereinafter described, an air line 38 communicates with the filtrate zone 28. A pressure sensor line 40 is connected between the filtrate zone 28 (via the air line 38) and the influent zone 30, and includes a differential pressure sensor 42 which senses the pressure drop across the filter bed 24. A vent line 44 communicates with the top of the tank 18, permitting the venting of gases to the atmosphere.

Referring again to FIGS. 1–3, liquid for filtration is delivered to the apparatus 10 via a main liquid inlet pipe 50 which communicates with a flow splitter 52. The flow splitter 52 divides the flow into three equal portions, and distributes it to the filter units 12, 14, 16 via influent pipes 54, 56, 58, respectively, which communicate with the influent zones as shown in FIG. 4.

Each of the influent pipes 54, 56, 58 has an influent valve 60, 62, 64, respectively, and each influent pipe 54, 56, 58 also communicates with a backwash outlet pipe 66, 68, 70, respectively, downstream of the influent valves 60, 62, 64. As used herein, the terms "upstream" and "downstream" refer to the direction of liquid flow during the service cycle, as shown in FIG. 1. In the embodiment shown, each backwash outlet pipe 66, 68, 70 has a backwash outlet valve 72, 74, 76, and all three backwash outlet pipes communicate with a main backwash outlet pipe 78, which delivers backwash water to a suitable drain or recycles it back through the main liquid inlet pipe 50.

Communicating with the filtrate zone 28 of each filter unit 12, 14, 16 are filtrate outlet pipes 80, 82, 84, respectively, which are joined together at a T-connection 86. Each of these filtrate outlet pipes 80, 82, 84 has a filtrate valve 88, 90, 92, respectively. Each filter unit 12, 14, 16 has a backwash delivery pipe 94, 96, 98, respectively, associated therewith, each such backwash delivery pipe 94, 96, 98 having an associated backwash delivery valve 100, 102, 104, respectively. As shown in FIG. 1, the backwash delivery pipes 94, 96, 98 communicate with the filtrate outlet pipes 80, 82, 84 at a point upstream of the filtrate valves 88, 90, 92, for a reason that will hereinafter appear.

A primary filtration pump 106 is connected from the filtrate outlet pipes 80, 82, 84 to deliver liquid to an effluent pipe 108, which in turn, communicates with a main outlet pipe 110. The pump 106 has a check valve 112 on its outlet side to prevent liquid from flowing backward through the system when the pump is not in operation. The main outlet pipe 110 has a main outlet valve 114.

A booster pump 116, having a check valve 118 on its outlet side, also communicates with the effluent pipe 108 on its downstream side, and with the filtrate outlet pipes 80, 82, 84 on its upstream side. As with the primary filtration pump 106, the booster pump 116 communicates with the filtrate outlet pipes 80, 82, 84 downstream of the filtrate valves 88, 90, 92. As previously mentioned, in the preferred embodiment of the invention, means are provided for delivering air under pressure to the effluent zones 28 of the filter units 12, 14, 16. To this end, the apparatus is provided with a pressurized air supply means 120, which communicates with the filter units 12, 14, 16 via air lines 38, 122, 124, respectively. Each of these air lines 38, 122, 124 has an air valve 126, 128, 130, respectively, permitting each air line to be individually turned on or shut off.

As those skilled in the art will no doubt appreciate, all of the valves shown in the drawings are preferably remotely controlled valves, such as pressure-activated or solenoid valves as are well known to those skilled in the art. Furthermore, the apparatus preferably includes automatic control means (not shown) for automatically controlling the service, air-scour, and backwash cycles.

Liquid and gas flow during the operation of the apparatus 10 is shown by the heavy lines in FIGS. 1-3. Referring to FIG. 1, the apparatus 10 is shown during service cycle, i.e., while liquid is being filtered by the filter units 12, 14, 16 and delivered to service through the main outlet line 110. By the term "service," applicants refer to any use whatever that is to be made of the filtered liquid filtered in accordance with the present invention. Such uses might include, for example, removal of particulates from water so that the water can be used as a cooling medium, removal of pollutants from water prior to discharge, etc.

During the service cycle, liquid containing suspended solids is delivered to the apparatus 10 via the main liquid inlet pipe 50. Ordinarily, this liquid will be water, although it should be understood that other liquids may be filtered in accordance with the present invention. The flow splitter 52 divides the flow into three equal portions, which are delivered at equal flow rates through the influent pipes 54, 56, 58 to the respective filter units 12, 14, 16. During the service cycle, all valves are open except for the backwash outlet valves 72, 74, 76, the backwash delivery valves 100, 102, 104, and the air valves 126, 128, 130. Liquid flows downwardly through the filter bed 24 to the filtrate outlet pipes 80, 82, 84. This liquid is pumped by the pump 106, and is delivered to service through the main outlet line 110.

The primary filtration pump 106 is controlled by the lower and upper level sensors 32, 34 in each of the filtration units 12, 14, 16. The level sensors 32, 34 and pump 106 are connected to the control means (not shown) in a manner such that the pump 106 is stopped when the liquid level in the influent zone 30 (FIG. 4) of one of the filter units 12, 14, 16 falls below the lower level sensor 32, which is ordinarily a short distance, say 6 inches, above the filter bed 24. Because the pump 106 is shut off, no liquid flows to service, and the level in the influent zone 30 begins to rise. When the liquid level in all of the filter units 12, 14, 16 has reached the upper level sensor 34, the pump 106 is switched on, and the liquid level will ordinarily again begin to fall.

In some instances, the rate at which liquid is delivered through the influent pipes 54, 56, 58 may be greater than the capacity of the primary filtration pump 106, so that the liquid level continues to rise past the upper level sensor 34. When the liquid level reaches the high level sensor 36, the booster pump 116 is switched on, doubling the rate at which liquid is pumped through the filter units 12, 14, 16. The flow of liquid through the booster pump 116 is indicated in FIG. 1 by a broken line. When the liquid in all of the filter units 12, 14, 16 has fallen below the upper level sensor 34, the booster pump 116 will be shut off.

As particles are collected by the filter bed 24, the pressure drop across the filter bed 24, as sensed by the differential pressure sensor 42, increases. For example, where the normal pressure drop across the filter bed 24 might be about 1 foot, the bed will ordinarily be ready for backwashing when the pressure drop has reached a level of three feet. When the pressure drop of a given filter unit reaches a predetermined level, indicating that the filter bed 24 requires cleaning, a signal is provided to the control means (not shown). In the three-unit embodiment shown, an interlock in the control unit prevents the cleaning of more than one filter unit at a time.

The first step in the cleaning cycle is the gas-scour step, illustrated in FIG. 1 for the first filter unit 12. Although, other gases may also be employed, for convenience, in the following description this gas will be referred to as air. The control means is programmed so that the air-scour cycle will not be initiated until the liquid in at least one of the filter units 12, 14, 16 has been pumped down to the lower level sensor 32. If the flow is extremely high, both the primary filtration pump 106 and the booster pump 116 can be employed to reach this level. In this manner, the liquid is brought to a relatively low level in each of the units prior to the air-scour step.

To initiate the air-scour step for the first filter unit 12, influent valve 60 and the filtrate valve 88 for this unit are closed, the air valve 126 on the air line 38 is opened, and the pressurized air supply 120 is started to deliver air to the filtrate compartment 28 through the air line 38.

Air under pressure passes upwardly through the filter bed 24, loosening entrapped particles, and suspending many such particles in the small amount of liquid remaining in the influent compartment 30. The air is vented to the atmosphere through the vent line 44. This delivery of air through the first filter unit 12 is indicated by the heavy line in FIG. 2. The air-scour step normally requires about five minutes. After the proper time period has elapsed, the pressurized air supply 120 is shut off, and the air valve 126 on the air line 38 is closed.

During the air-scour step, influent liquid continues to be delivered to the second and third filter units 14, 16 through the influent pipes 56, 58. Since the filter units 12, 14, 16 are normally pumped down to a low level just prior to the initiation of the air-scour step, neither pump 106, 116 will ordinarily run during the air-scour step, and no liquid will be delivered to service. However, in instances where extremely high flow rates are sometimes encountered, it is desirable during the air-scour step to program the control means (not shown) so that the primary filtration pump 106 is started only when the liquid level in one of the filter units 14, 16 reaches the high level sensor 36. The reason for this is that it is normally not desirable to filter liquid through the filter units 14, 16 during the air-scour step unless necessary since the filtration rate would be abnormally high because the filtration pump 106 is connected to only two rather than three filter units. Furthermore, it is desirable to allow a reservoir of liquid to build up in the remaining filter units 14, 16 for utilization during the backwashing step as described below.

Referring to FIG. 3, to initiate the backwashing step in the first filter unit 12, the backwash delivery valve 100 and backwash outlet valve 72 associated with the first filter unit 12 are opened. The main outlet valve 114 is also closed during the backwashing step. Both the primary filtration pump 106 and the booster pump 116 are switched on, and liquid is pumped from the effluent zones 28 of the second and third filter units 14, 16 to the effluent zone 28 of the first filter unit 12. Because two identical pumps 106, 116 are employed, and because the effluent flow from two filters is backwashing a single filter, the backwash delivery rate will be six times the normal downflow rate of the filter unit 12. In an embodiment where the optional booster pump 116 is not employed, the backwashing rate would still be three times the downflow rate, providing for efficient backwashing of the filter bed 24.

The backwash liquid passes out of the filter unit 12 through the influent pipe 54 to the backwash outlet pipe 66, and then to the main backwash outlet pipe 78, which delivers the water to a drain or eventually back to the unit through the main liquid inlet pipe 50.

As may be seen from the foregoing description, the apparatus 10 may also be operated in a manner to backwash any of the filter units 12, 14, 16 with effluent liquid from the other two units. For example, if it is desired to backwash the second filter unit 14, its associated influent valve 62 and filtrate valve 90 are closed, while its backwash delivery valve 102 and backwash outlet valve 74 are opened. The main outlet valve 114 is closed, and both pumps 106, 116 are operated as previously described. In a similar manner, the air-scour step for the second filter unit 14 is accomplished by closing its associated filtrate valve 90, starting the pressurized air supply 120, and opening its associated air valve 128.

It will be appreciated that the foregoing description of a specific embodiment does not constitute a description of all embodiments of the present invention, and that many modifications may be made while still falling within the spirit and scope of the invention. For example, a much larger number of filter units could be employed, and/or a larger number of pumps could be employed. In such a system, it would be possible to backwash more than one filter tank at a time, while still delivering the backwash liquid from a majority of the remaining filter tanks. It will also be appreciated that where multiple pumps are employed to increase the flow rate during backwash, it is not necessary to use more filter units to supply the backwash liquid than the number of units being backwashed. However, in the most preferred embodiment, the majority of filter units will be employed to backwash a minority of the units.

Finally, it will be appreciated that the gas-scour step, although highly desirable, is not an essential feature of the present invention, and this step together with its associated apparatus, can be eliminated without departing from the invention.

These and other modifications and variations of the invention will obviously occur to those skilled in the art, and it is intended to cover in the appended claims all such modifications and variations as fall within the true spirit and scope thereof.

We claim:

1. Improved apparatus for the filtration of liquids comprising: a plurality of filter units, each of said units comprising an upper influent zone, a filter bed, and a lower filtrate zone; means for delivering liquid to said influent zones; means including pump means operatively connected for pumping liquid from all of said filtrate zones to service at a given pumping rate; means for delivering liquid from the filtrate zones of a majority of said filter units through said pump means to the filtrate zones of a minority of said filter units, whereby to backwash the filter beds of said minority of said filter units with liquid delivered simultaneously from said majority of said filter units; means including booster pump means operatively connected to pump additional liquid from said filtrate zones of said majority of said filter units to said filtrate zones of said minority of said filter units and to provide auxiliary pumping of liquid through all of said filter beds to service; and level sensor means in said influent zones, said level sensor means being operatively connected to said booster pump means when said liquid is being delivered to service to start said booster pump means when the liquid level in one of said influent zones rises above a given high level and to stop said booster pump means when said liquid in said influent zone falls below a given level.

2. The apparatus as defined in claim 1 further comprising means for delivering gas under pressure to said filtrate zones.

3. Improved apparatus for the filtration of liquids comprising: a plurality of filter units, each of said units comprising an upper influent zone, a filter bed, and a lower filtrate zone; means for delivering liquid to said influent zones; means including pump means for pumping liquid to service from all of said filtrate zones at a given pumping rate; means for delivering liquid from the filtrate zones of a first portion of said filter units through said pump means to the filtrate zones of a second portion of said filter units whereby to backwash the filter beds of said second portion of said filter units with filtered liquid delivered simultaneously from said first portion of said filter units; means including booster pump means operatively connected to pump additional liquid from said filtrate zones of said first portion of said filter units to said filtrate zones of said second portion of said filter units and to provide auxiliary pumping of liquids through all of said filter beds to service; and level sensor means in said influent zones, said level sensor means being operatively connected to said booster pump means when said liquid is being delivered to service to start said booster pump means when the liquid level in one of said influent zones rises above a given high level and to stop said booster pump means when said liquid in said influent zone falls below a given level.

4. The apparatus as defined in claim 3 wherein said plurality of filter units consists of two filter units.

5. The apparatus as defined in claim 3 wherein said plurality of filter units comprises at least three filter units.

6. The apparatus as defined in claim 3 further comprising means for delivering air under pressure to said filtrate zones.

7. Improved apparatus for the filtration of liquids comprising: three filter units, each of said units comprising an upper influent zone, a filter bed, and a lower filtrate zone; means for delivering liquid to said influent zones; means including pump means for pumping liquid to service from all of said filtrate zones at a given pumping rate; means for delivering liquid from the filtrate zones of any two of said filter units through said pump means to the filtrate zone of the remaining filter unit; means including booster pump means operatively connected to pump additional liquid from said filtrate zones of said two of said filter units to said filtrate zone of said remaining filter unit, whereby to backwash the filter bed of said remaining filter unit with filtered liquid delivered simultaneously from said two of said filter units and to provide auxiliary pumping of liquid through all of said filter beds to service; and level sensor means in said influent zones, said level sensor means being operatively connected to said booster pump means when said liquid is being delivered to service to start said booster pump means when the liquid level in one of said influent zones rises above a given high level and to stop said booster pump means when said liquid in said influent zone falls below a given level.

8. The apparatus as defined in claim 7 further comprising means for delivering air under pressure to said filtrate zones.

* * * * *